Jan. 17, 1933. C. H. HOWELL ET AL 1,894,314
VALVE
Filed July 20, 1931 4 Sheets-Sheet 4

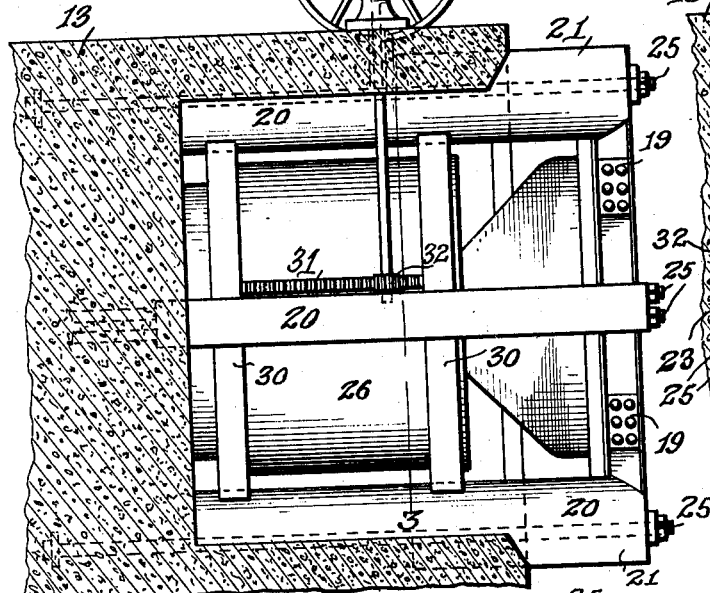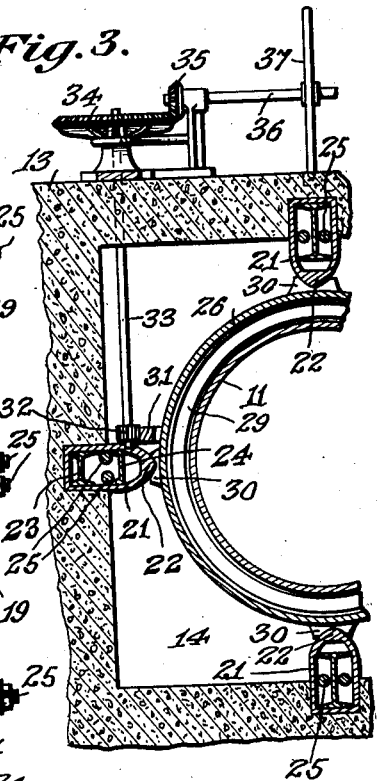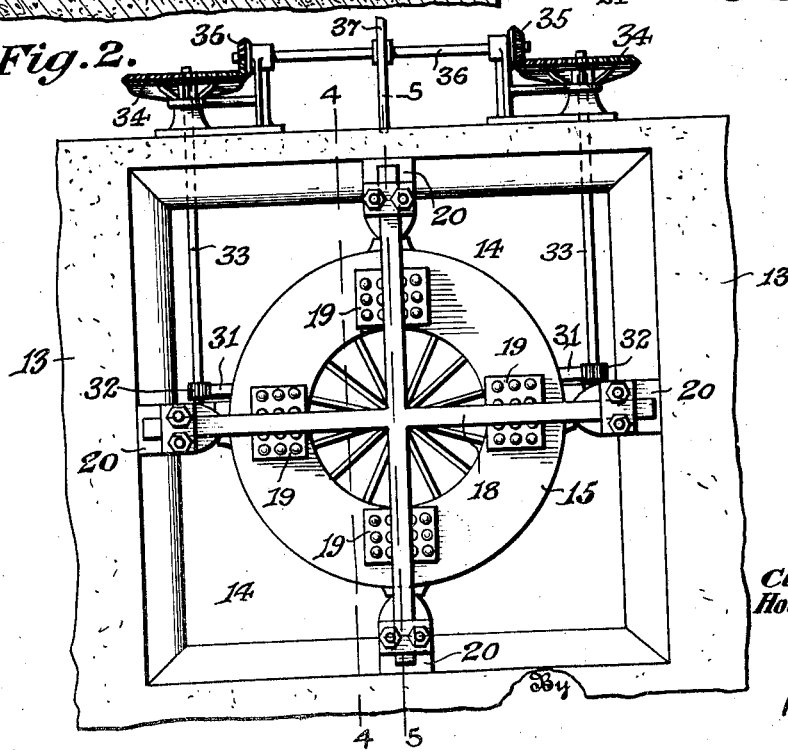

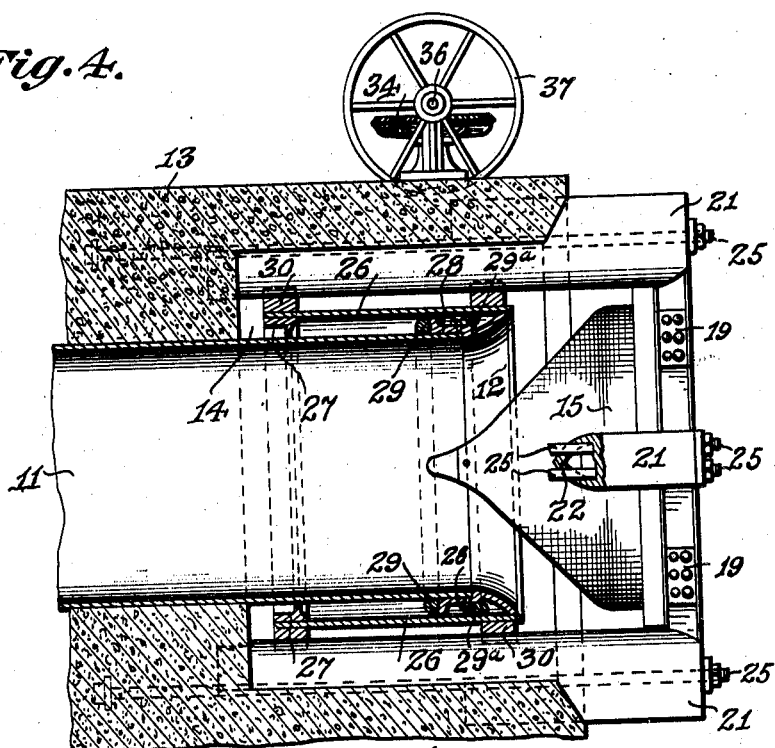
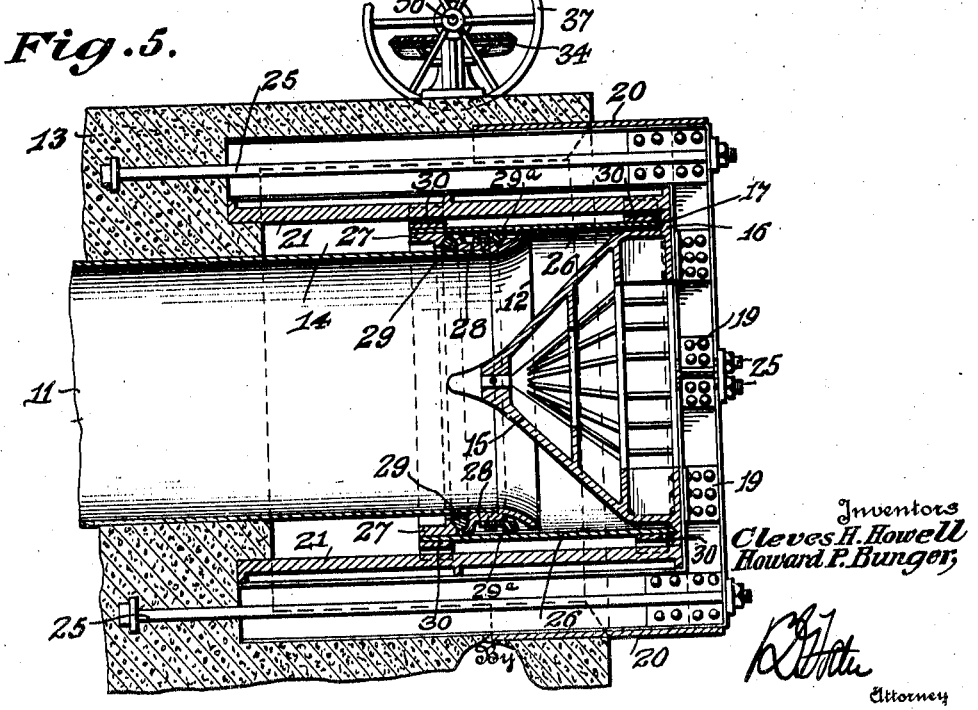

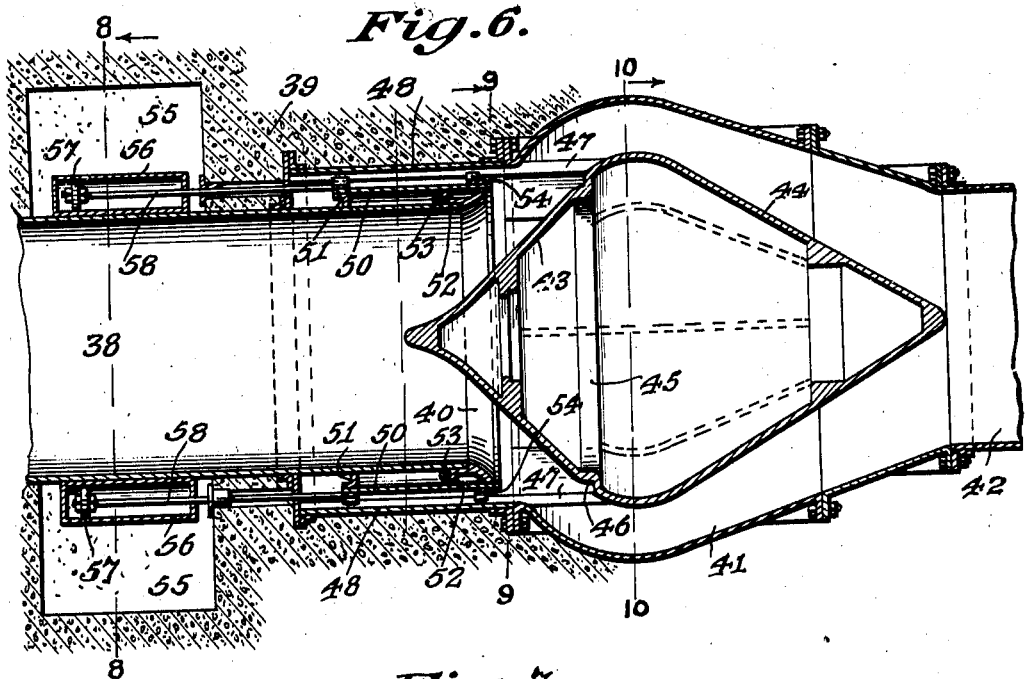
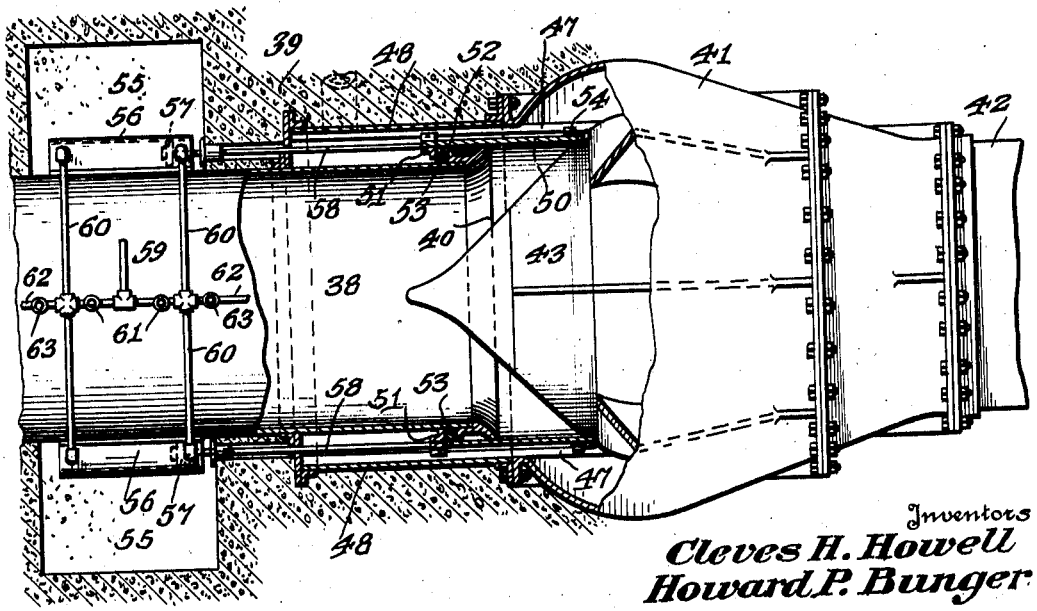

Inventors
Cleves H. Howell
Howard P. Bunger,
By
Attorney

Patented Jan. 17, 1933

1,894,314

UNITED STATES PATENT OFFICE

CLEVES HARRISON HOWELL, OF ALBUQUERQUE, NEW MEXICO, AND HOWARD PHELPS BUNGER, OF WHEAT RIDGE, COLORADO

VALVE

Application filed July 20, 1931. Serial No. 552,012.

The present invention relates more particularly to valve structures for relatively large conduits, such as are used for example in irrigation and like projects, though it is by no means restricted to such use, in that it is available for employment to control the flow of any fluid.

The object in view is to provide a novel structure that is practical for the purpose, is such that the movement of the valve is not materially resisted by the flowing body of liquid or fluid that it controls, the valve per se moreover having a mounting that insures its being properly directed during its movements between its open and closed positions.

In the accompanying drawings:

Figure 1 is a side elevation of one embodiment of the invention.

Figure 2 is an end elevation of the same.

Figure 3 is a cross sectional view on the line 3—3 of Figure 1.

Figures 4 and 5 are longitudinal sectional views taken respectively on the line 4—4 and 5—5 of Figure 2.

Figure 6 is a longitudinal sectional view through another embodiment of the invention with the valve in its open position.

Figure 7 is a view corresponding to Figure 6, but with the valve in its closed position.

Figure 8:
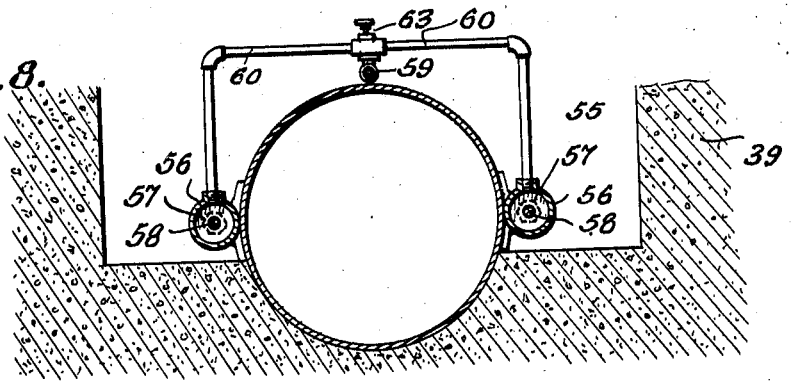
Figure 9:
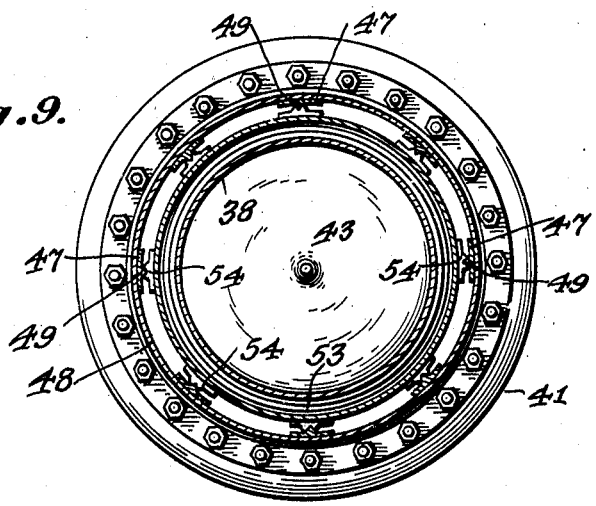
Figure 10:
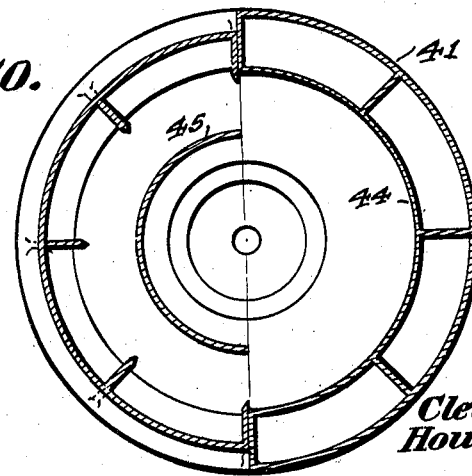

Figures 8, 9 and 10 are cross sectional views taken respectively on the line 8—8, 9—9 and 10—10 of Figure 6.

Referring first to the embodiment disclosed in Figures 1-5 inclusive, a tubular conduit 11 is employed having a discharge mouth in the form of a flared lip ring 12. The conduit is shown as being located in a body 13 of concrete, the discharge end being contained in a chamber 14 formed in said body. Located in advance of the discharge end and facing the same, but in spaced relation thereto, is a stationary plug member 15 preferably conical in form and including a peripheral base flange 16 provided in its rear face or that opposed to the conduit with an annular valve seat 17.

The plug member 15 is carried by a suitable frame which as shown in Figure 2 preferably consists of a spider 18 to which the base flange 17 is secured by brackets 19. The outer terminals of the arms of the spider 18 are secured to the outer ends of tie members 20 that extend rearwardly into the concrete body 13 longitudinally of but spaced from the conduit 11. In the embodiment disclosed and as shown more particularly in Figures 3 and 5, these tie members consist of shells 21 having inner convergent sides forming trackways or guideways 22. The shells are reenforced by suitable beams, as I-beams 23 and channel beams 24 that are located longitudinally in the chambers of said shells. Anchor bolts 25, extending longitudinally through the shells, have their inner ends embedded in the concrete. Thus the plug member is rigidly supported and yet ample space is allowed around it and through the frame for the discharge of liquid flowing from the discharge mouth of the conduit 11.

In order to control the flow of liquid a tubular valve 26 is employed which surrounds the discharge end of the conduit and reciprocates thereon, the outer end of the valve 26 engaging in the seat 17 when the valve is closed as shown in Figure 5, and said valve operating in the space between the conduit 11 and the tie members 20. The rear end of the tubular valve is preferably provided with an internal ring 27 and the mouth piece 12 of the conduit has a rearwardly extending ring portion 28 in opposition to said ring 27. Located between the rings 27 and 28 is a suitable packing ring 29 preferably of compressible material. An additional sealing ring 29a is also preferably employed to stop any objectionable leaks when the valve is open or partly open, its form being such that the back pressure of the water insures its sealing against the inner face of the tubular valve 26. The tubular valve 26 furthermore is provided on its outer side with shoes 30 that ride the trackways or guideways 22 of the tie members, these shoes preferably being located at both ends of the valve so as to secure widely separated bearings that insure the easy movement of the valve.

Any suitable means may be provided for reciprocating the valve. Thus as shown, the valve is provided on diametrically opposite sides with longitudinal racks 31. These racks are engaged by pinions 32 on vertical shafts 33 that extend out of the chamber 14 and above the concrete body. Their upstanding ends have beveled gears 34 engaged by smaller drive gears 35 on a horizontal shaft 36. The shaft 36 may be provided with an operating hand wheel 37. By turning the wheel 37 in opposite directions, the valve will of course be reciprocated and thus be closed and opened.

In the disclosure of Figures 1–5 inclusive it will be noted that the discharge from the conduit is around the plug member and into atmosphere, this discharge being in the form of a hollow cone jet that is divided into segments by the tie members and guides. The energy in this form of jet is less concentrated and therefore more easily dissipated than the ordinary form of a single jet. Consequently it will cause less destruction to the receiving channel. The conical plug member acts as a diffuser and the tie members increase this diffusing action. Except for the small portion of the closing movement when the contact between the valve and its seat is being made, the movement of the cylinder takes place without material resistance from the fluid pressure. Substantially the only operating force required is that necessary for overcoming the friction of the valve shoes on the guides and to force the valve through the moving liquid. This permits the use of relatively large valves under high heads with a small amount of power and a minimum of operating mechanism. When closed the pressure on the valve is in the direction of the opening movement which again is a favorable condition as it tends to offset the resistance of inertia and starting friction, and thus reduce the required operating force.

The valve may also be located within the conduit line, and such a structure is shown in Figures 6–10 inclusive. The conduit 38 shown as located in a body of concrete 39 (though the enclosure is merely incidental) has a discharge end 40 that delivers into an enlarged chamber 41 which tapers to a succeeding conduit section 42 that may lead to any delivery point. Within the chamber 41 is a fixed conical plug member 43 facing the discharge end of the conduit, but spaced therefrom. The plug member in this instance has a reversely disposed tapered tailpiece 44 extended in the direction of flow, or in other words toward the conduit section 42. The plug member is provided near its base with an inset portion 45 providing in its outer face an annular groove or valve seat 46.

The plug member is supported by longitudinally disposed bars 47 that are located within an outer tubular casing 48 extended rearwardly from the chamber 41 and surrounding the discharge end of the conduit 38. The inner sides of the bars 47, as will be clear by reference to Figure 9, have inset ribs 49 constituting tracks or guideways.

The tubular valve is shown at 50. It surrounds the discharge end of the conduit 38 and has an internal ring 51 at its free end that rides thereon. The ring 40 is provided with an outstanding flange 52 and between this flange and the ring 51 is a suitable packing ring 53 that is compressed when the valve is closed, or as shown in Figure 7. The valve 50 is provided on its outer side with shoes 54 that ride on the tracks or ribs 49.

In this form of structure there is shown fluid operating means for actuating the valve 50. To this end in a compartment 55 formed behind the casing 48 are cylinders 56 within which reciprocate pistons 57. The pistons have piston rods 58 that are connected to the valve. Fluid under pressure is supplied from any suitable source through a pipe line 59 to branches 60 that lead to the ends of cylinders 56, communication being controlled by suitable valves 61. Exhaust pipes 62 lead from the pipes 60 and are controlled by valves 63. Obviously when fluid under pressure, as oil, is admitted to the rear ends of the cylinders 56, the pistons will be forced forwardly and the valve will be moved across the space between the discharge end of the conduit 38 and the plug member 43 and when the free end of the valve seats in the groove 46, the discharge from the conduit will be cut off. During this operation the fluid in advance of the pistons if permitted to exhaust through the right hand pipe 62. A reverse operation effects the opening movement of the valve. The structure is closely analogous to that first described and has all the advantageous features thereof.

From the foregoing, it is thought that the construction, operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What we claim, is:—

1. A valve mechanism for hydraulic and like conduits comprising a conduit having a discharge mouth, a plug member spaced from the conduit in advance of the mouth and having a valve seat, spaced trackways located longitudinally of the conduit outside and spaced from the same, said trackways extending behind the open mouth of the conduit, and a tubular valve surrounding the conduit and located between the same and the trackways, said valve being slidable on the trackways and movable across the space between the conduit and plug member.

2. In a valve, the combination with a conduit having an end portion, of a plug member in advance of and spaced from the end portion, spaced tie members connected to the plug member and extending across the space between it and the end portion of the conduit, said tie members being located in spaced relation to said conduit alongside the latter behind its open end, and a tubular valve slidable between the tie members and conduit and movable across the space between the conduit and the plug member, said valve having bearings on the tie members.

3. In a valve, the combination with a conduit having an end portion, of a plug member in advance of and spaced from the end portion, tie members connected to the plug member and extending across the space between it and the end portion of the conduit, said tie members being located in spaced relation to said conduit alongside the latter, a tubular valve slidable between the tie members and conduit and movable across the space between the conduit and the plug member, and guide shoes on the outer side of the valve and slidable on the tie members.

4. In a valve, the combination with a conduit having a discharge end, of a plug member facing the discharge end in advance of and spaced from the same providing an outlet, a supporting frame for the plug member including tie bars extending across the space between the plug member and conduit and located longitudinally of and outside the latter in spaced relation thereto, a tubular valve slidable on the conduit between the same and the tie bars and movable across the space between the conduit and the plug member, shoes on the outer side of the valve that slidably engage the bars, and means for reciprocating the valve.

5. A valve mechanism for hydraulic and like conduits comprising a conduit having an open mouth, a plug member spaced from the conduit in advance of the mouth, means for supporting the plug member including spaced tie members located across the space between the plug and conduit mouth and extending longitudinally along the conduit behind its open mouth, and a tubular valve movable on the conduit across the space between the mouth and plug, said valve having bearings on the said tie members and being guided thereby.

6. A valve mechanism for hydraulic and like conduits comprising a conduit having an open mouth, a plug member spaced from the conduit in advance of the mouth, means for supporting the plug member including spaced tie members located across the space between the plug and conduit mouth and extending longitudinally along the conduit behind its open mouth and outside said conduit in spaced relation thereto, and a tubular valve movable on the conduit inside the tie members and across the space between the mouth and plug, said valve having bearings on the said tie members and being guided thereby.

In testimony whereof, we affix our signatures.

CLEVES H. HOWELL.
HOWARD P. BUNGER.